Jan. 5, 1954

J. J. ALLES 2,665,417

CIRCUIT CONTROLLER

Filed June 19, 1950

INVENTOR.
JOHN J. ALLES
BY
Pollard and Johnston
ATTORNEYS

Jan. 5, 1954
J. J. ALLES
2,665,417
CIRCUIT CONTROLLER
Filed June 19, 1950
4 Sheets-Sheet 2
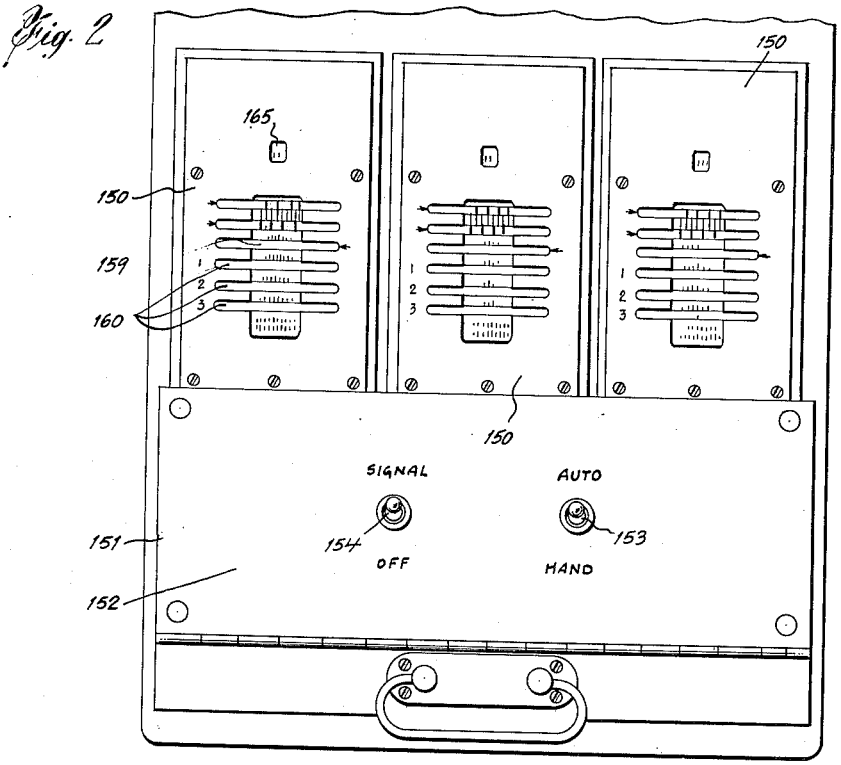
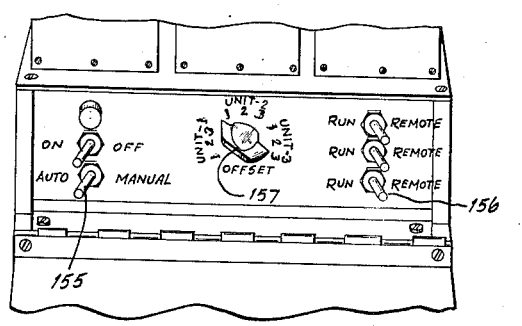
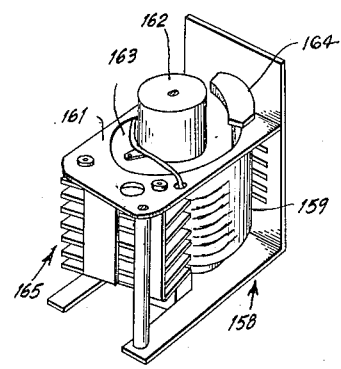
INVENTOR.
JOHN J. ALLES
BY
Pollard and Johnston
ATTORNEYS Jan. 5, 1954                J. J. ALLES                2,665,417
                        CIRCUIT CONTROLLER
Filed June 19, 1950                              4 Sheets-Sheet 3

INVENTOR.
JOHN J. ALLES
BY
Pollard & Johnston
ATTORNEYS

Jan. 5, 1954  J. J. ALLES  2,665,417
CIRCUIT CONTROLLER
Filed June 19, 1950  4 Sheets-Sheet 4
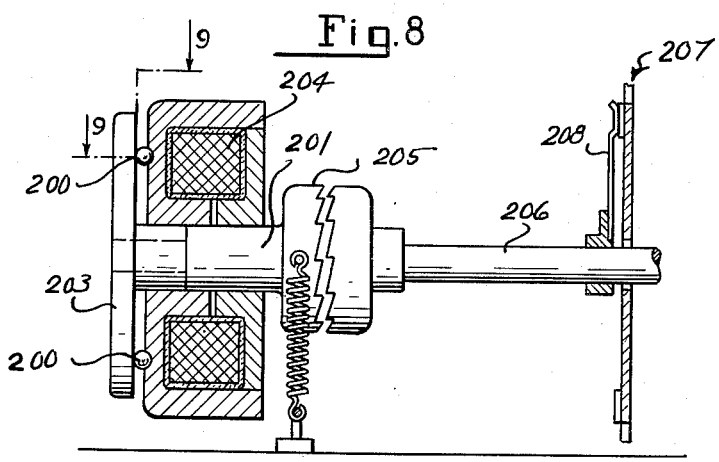
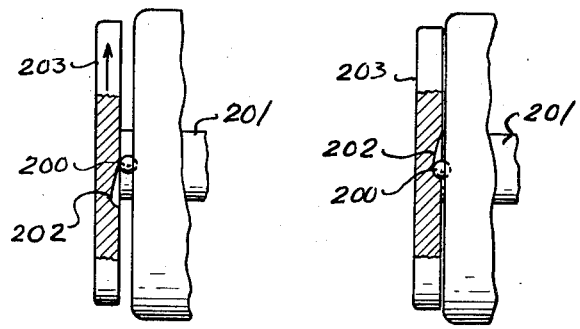
INVENTOR.
JOHN J. ALLES
BY
Pollard and Johnston
ATTORNEYS Patented Jan. 5, 1954

2,665,417

UNITED STATES PATENT OFFICE 2,665,417

CIRCUIT CONTROLLER

John J. Alles, Wilkes-Barre, Pa.

Application June 19, 1950, Serial No. 168,904

19 Claims. (Cl. 340—40)

The invention relates to a signal control apparatus and particularly to an apparatus suitable for use in controlling highway traffic signals.

One of the problems in prior devices has been the arrangement of a control system wherein the operational sequence of lights at the various intersections can be readily changed from a central station and maintained properly synchronized relative thereto without undue complexity. Also, it is frequently required to make provision for different programs for display of the various colors at the intersections depending upon the flow of traffic. Additional features such as flashing amber, shut-down, all read, etc., also are desirable. In many prior devices, a multiplicity of control wires to the local intersection units has been necessary with a consequent high cost of cable, installation, and maintenance thereof. Another problem has been the provision of suitable and flexible local control units. Still another problem is to build all of the required parts into a compact controller to obtain the many functions necessary.

In controlling the flow of traffic, it frequently is desirable to provide for a progressive change of the lights at the various intersections along the street and to change this progression depending upon the flow of traffic, which usually changes at various times of the day. It also is desirable to be able to change the relative display intervals of the green and red lights according to the program desired.

One of the objects of the present invention is to provide a simplified control circuit arrangement wherein the number of wires and current consumption required for control of the local control circuits is materially reduced.

Another of the objects is to provide a control arrangement wherein erratic or false signals will be avoided.

Still a further object of the invention is the provision of an improved local control device which can be serviced and maintained with ease.

In order to select the desired program at the intersections, the central station can be connected by two control wires with the various local units, a common ground connection also being employed. The construction of the controller also lends itself to radio propagated programming pulses. Each of the local units can have an intelligence storing or memory device therein responsive to intelligence or pulses transmitted over at least one of the control wires or by wave propagation. The memory switch may take the form of a stepping switch as described hereafter. A program switch is connectable with the memory switch at a predetermined time so that the intelligence stored on the memory switch can be transferred in a suitable manner to position the program switch. One or more rotatable timing cylinders driven by synchronous motors can be provided at the local units, said cylinders having switch operating keys or projections. The program switch selects the various circuits so as to cause operation of the desired rotatable cylinder at each controller, select the desired offset key of that cylinder, and connect the offset or synchronizing relay with the correct control members. The program switch also connects the light switch operating shaft motor with the source of power through suitable switch operators.

The control station can be operated in conjunction with relays at the local units so as to prevent the program switch from following the memory switch as a program is being set up on the memory switch, and to cause transfer of the intelligence from the memory switch to the program switch only at a predetermined time of operation of the lights, such as during the main street green period. A supervisory relay also can be provided so that in the event of failure of the control circuits, all of the units will be returned to a predetermined position, such as offset key No. 1 of rotatable cylinder No. 1.

One of the control circuit wires also can be used for a synchronizing arrangement of the offset keys as is known in the art. Preferably, the connections are made with the switches so that only a single offset relay is required in the circuit. The automatic switching means can be located close to the equipment being controlled and it lends itself to a minimum amount of wiring.

In a further aspect of the invention, the apparatus can be arranged so that a program can be set locally on a unit by the same means used for remote programming. Also, the apparatus can be arranged so that the front panel containing certain of the switches can be locked as far as the local traffic supervisor or policeman is concerned, and yet have switches interiorly of the main panel for operation by maintenance men or special traffic supervisors. The unit also can be arranged on a telescoping slide arrangement and jack mounted so that it can be pulled from the box and rotated to provide access to the various parts. The individual rotatable cylinders, together with their motor, can be jack mounted so that they can be removed with ease, repaired or a new one put into position.

In a further aspect of the invention, the light switch control shaft having switch operators or cams thereon for operating the various light switches at the intersection can be operated by a motor instead of the conventional solenoid. In such a case, the motor is connected through a worm and worm wheel arrangement with the shaft. The worm is connected to the motor shaft through a slipping clutch mechanism and an escape mechanism is provided so that the motor worm will turn only one revolution at each energization thereof. The motor is geared to the shaft appropriately so that a high torque is available for operating the switches.

The rotatable cylinder can be provided with a pair of advance keys so that the switches operated thereby will not wear as rapidly as a single advance key with a single switch. The construction also simplifies the construction of the cylinder and a substantial wall is provided between the various slots.

These and other objects, advantages, and features of the invention will become apparent from the following description and drawings.

In the drawings:

Figure 2 is a schematic front view of one form of the device.

Figure 3 is a fragmentary front view similar to Figure 2 with the exception that the front panel has been swung to open position.

Figure 4 is a perspective view of one unit.

Figure 8 is an enlarged fragmentary view partially in section of one type of stepping switch.

Figure 9 is a fragmentary view partially in section of the left end of Figure 8 showing the parts before energization of the solenoid.

Figure 10 is similar to Figure 9 except the solenoid has been energized and the switch rotated.

Figure 1:
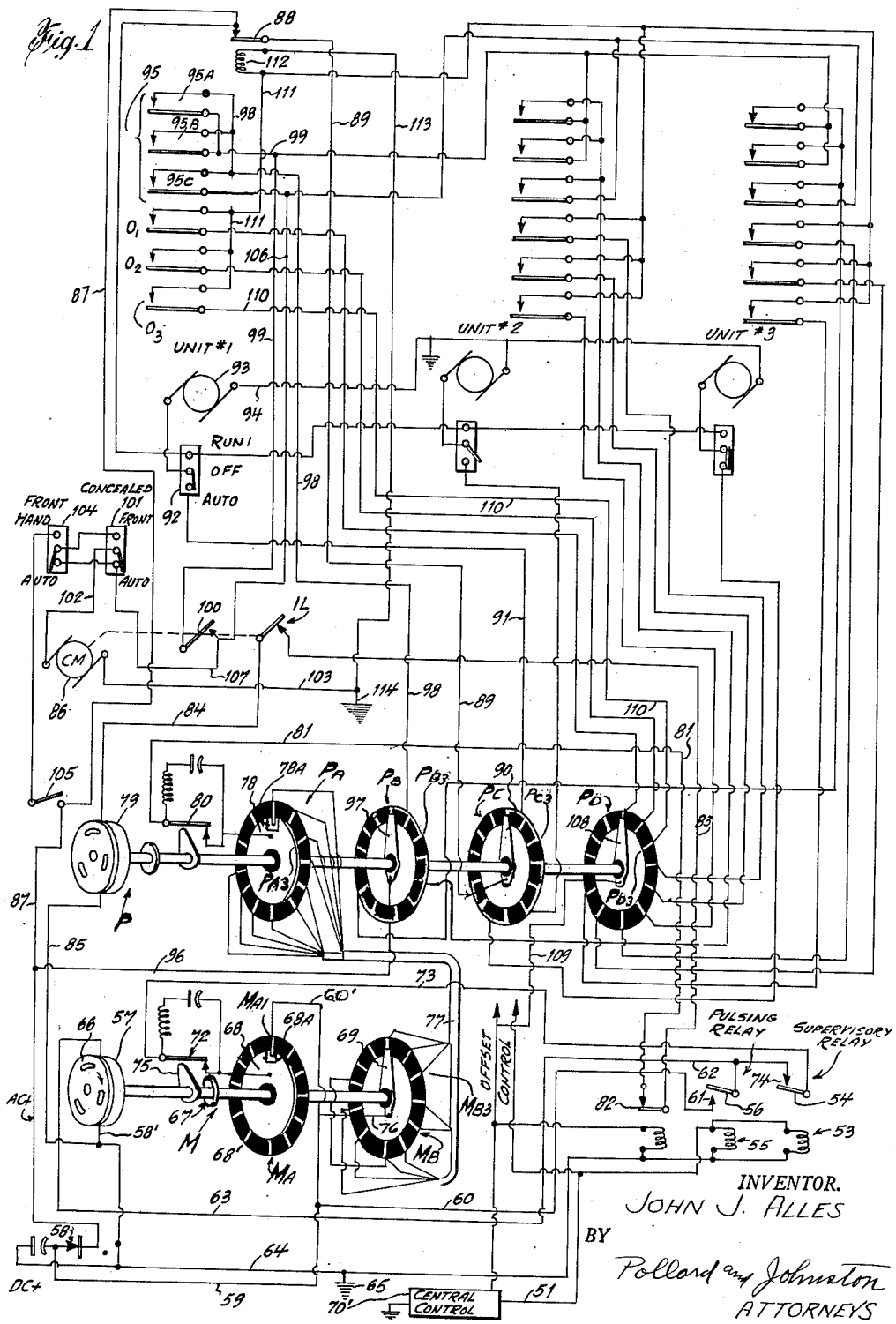
Figure 1 is a schematic wiring diagram of one form of the invention.
Figure 7:
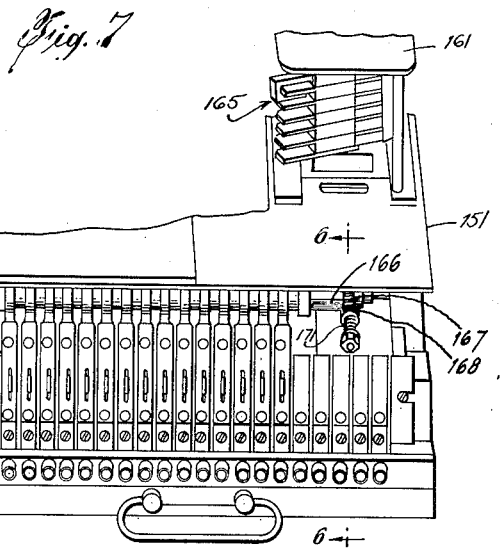
Figure 7 is a fragmentary rear view.

The invention will be described specifically in conjunction with a three drum or cylinder controller arrangement, each of the cylinders having three offset keys and two advance and one release keys. The three offset keys will permit the selection of any one of the three offsets or relative synchronism with the central station for the given drum. It is to be understood, of course, that various types and arrangements can be used employing various features of the invention.

The central control station is diagrammatically illustrated at 70', said central control station having suitable mechanism for sending out the required number of pulses at the desired times and placing the necessary control potentials on the control wires. This can be accomplished through a time clock or other similar pulse or intelligence sending apparatus. The central control station also may have therein a suitable cam operated switch, or other type of switch, for interrupting the offset control current once every predetermined period for the purpose of bringing all of the local units involved into synchronism therewith. The offset wire can carry the synchronizing current for the various local stations and also can be employed to disable the program change arrangement when a new program is being set up for operation thereafter, as will be explained hereafter.

A local control unit for a single intersection is illustrated but it is to be understood that the central control station can be connected with as many local units as desired.

Various types of stepping switches may be used but it is preferable to use one of the type schematically illustrated wherein a solenoid is employed to move axially a switch rotator attached to a stepping switch shaft. In such a switch, a plurality of balls 200 (Figs. 8, 9, and 10) or similar projections are movably located at spaced points on the axially movable rotator including shaft 201 and disc 203, said balls being in contact with circumferentially inclined surfaces 202 on the switch frame or operating disc 203. When the rotator is pulled inwardly relative to said surfaces by a current pulse on the solenoid 204, the balls will ride down the inclined paths so as to cause oscillation of the rotator, such being illustrated in the change from Figure 9 to Figure 10. In Figure 10, the disc 203 has been moved inwardly by the solenoid. The rotator can be connected through a suitable ratchet mechanism 205 to the stepping switch operating shaft 206. In one type of stepping switch, the rotator can oscillate 35° for each axial movement, such depending upon the number of contacts, etc.

Wafers or units 207 may be provided with switch plates or switch arms 208 operable by the shaft as will be described hereafter. The stepping switches M and P are shown in a central or first position to which switch M is automatically or otherwise returned prior to a setting or resetting of a program.

In this first position, the control can be arranged so that offset key No. 1 of the rotatable cylinder of unit No. 1 is connected to the light switch operating mechanism. Stepping switch M can be referred to as the "memory switch" and stepping switch P as the "programming switch."

The wafers are indicated by appropriate letter subscripts and the switch contacts on a particular wafer by an additional number subscript.

The control circuit from the central station lead 51 is connected to supervisory relay 53, said lead normally carrying a voltage, such as 48 volts, to which a pulse of higher voltage can be added for the purpose of operating the local pulsing relay 55. The lower control voltage on supervisory relay 53 will hold switch 54 open so as to prevent return of memory switch M to its first position except when desired or when the control circuit fails.

When it is desired to set up a program, suitable pulses can be applied to the control lead 51. As each pulse is received by pulsing relay 55, switch contact 56 will be closed so as to energize with D. C. the memory switch solenoid 57. Such energization takes place from the rectifier 58, lead 59, lead 60, contact 61, blade 56, lead 62, lead 63, solenoid 57, lead 58', lead 64 to ground 65. Thus, each pulse from the central station received by pulsing relay 55 will put a D. C. impulse on solenoid 57 causing axial movement and rotation of the stepping switch rotator 66 and operation of the schematically indicated ratchet 67, similar to 205 of Figure 8, to turn stepping switch shaft 68' (206 of Fig. 8). Upon each de-energization of the solenoid 57 (204 of Fig. 8), the switch rotator 66 (201 of Fig. 8) will move to the left or counter-clock-wise and return to its normal position.

As a result of the stepping switch arrangement just described, switch plate or disc 68 of wafer $M_A$ and the switch contact arm 69 of wafer $M_B$ will be rotated to the desired switch contact according to the program to be selected and will be maintained in such position as long as the supervisory relay remains energized, thus storing the received intelligence. The pulsing relay is not operated by the lower voltage but is operated by the higher pulsing voltage.

In the event power fails, or it is desired to return the memory switch and circuit to its first position, the supervisory lower voltage on the control circuit can be interrupted. This will de-energize supervisory relay 53 and will permit switch 54 to close. Assuming that switch disc 68 has been rotated so that the blank space 68A is opposite a contact other than $M_{A1}$, the D. C. supply from rectifier 58 will be connected through lead 59, lead 60', contact $M_{A1}$, switch disc 68, stepping switch 72, lead 73, switch blade 54, contact 74, lead 62, lead 63, memory switch solenoid 57, lead 58', lead 64 and ground 65 (negative side of the D. C. supply). As switch rotator 66 is moved axially, the local pulsing switch actuator 75 will be moved upwardly to move memory pulsing switch blade 72 and break the circuit to the memory switch solenoid. This will permit the switch rotator plate 66 to move back into readiness for another oscillation. The pulsing switch again is closed and another pulse will be given the solenoid so that switch disc 68 will continue its stepwise rotation until the cut-out portion 68A of disc 68 reaches the first position or contact $M_{A1}$ when contact is broken. It thus becomes apparent that whenever the supervisory relay 53 is de-energized that memory switch M will return to a first position.

The cam actuator 75 can be operated in various manners, preferably, so that when switch 72 has been opened after rotator 66 has completed its rotation, it will be kept open until rotator 66 has returned to its original or de-energized position. It will be seen that if memory switch M is in any position except position No. 1, that the local pulsing switch 72 and solenoid circuit will be energized to cause return of memory switch M automatically to the first position, providing contact 54 is closed.

The next operation is to transfer the intelligence indicated by position of the memory switch M to the programming switch P or to transfer the stored information from one stepping switch to the other. Assuming that the memory switch has been moved to position No. 3 so that switch arm 69 is engaged with contact $M_{B3}$, then the D. C. positive line 59 from rectifier 58 will be connected through lead 76 with the switch arm 69, contact $M_{B3}$, cable 77 and the contact $P_{A3}$ or the third position on the switch wafer $P_A$ of the program switch P.

The movement of program switch P to the third position is prevented until the lights or controlled circuits are in a certain predetermined position. Preferably, this change is made during the main street green period. Also, it is desirable that no transfer take place while the memory switch is having a program set-up thereon, although, the main street green may be on. The details of the light switch operating shaft and motor mechanism will be described at a later point.

One of the operators or cams on the light switch operating shaft is arranged to close interlock switch IL when the main street green switch is closed to permit completion of a circuit to the program switch solenoid 79. When the switch IL is closed, a circuit is completed from the positive D. C. lead 59, through line 76, switch arm 69, contact $M_{B3}$, cable 77, contact $P_{A3}$, local pulsing switch 80, lead 81, program cut-out relay 82, lead 83, closed interlock switch IL, lead 84, program switch solenoid 79, lead 85, and back to the common ground lead 64. Pulsing switch 80 then will cause pulses to be fed to program switch solenoid 79 until the cut-out portion 78A of the switch disc 78 reaches contact $P_{A3}$ at which time the circuit will be broken and the program switch stopped at the third position or at the same position in which memory switch M is located. This will move each of the program switch blade arms on wafers $P_B$, $P_C$, $P_D$, to the third contact thereof. The program cut-out relay 82 is energized during the time that a program is being transmitted and placed on memory switch M. This is accomplished by subjecting said relay to a voltage above the offset wire voltage of 48 volts, for example, 115 volts. This will serve to open the program cut-out relay 82 and prevent the program switch from following the memory switch until the memory switch has reached its desired position, as governed by the intelligence being transmitted thereto, or during the time the motor switch is being reset. Preferably, relay 82, after once opened by the 115 volt pulse, will hang open on the 48 volt potential of the offset wire until the offset is de-energized by the central station, so that closure of 82 for operation of the program switch will take place at a predetermined time relative to the offset de-energization.

The light switch mechanism operating motor 86 is connected to a shaft having cams or switch operators thereon as will be described hereafter. The worm gear is arranged so that it makes a predetermined rotation at each energization thereof, the cams or operators being appropriately located on the operating shaft so as to operate the traffic lights (not shown) in their desired sequence.

The operation of the light switch operating shaft motor 86 is controlled by the advance and release keys of the timing units. As will be described hereafter, the keys operating the groups of switches are carried on a rotatable cylinder arrangement operated by a synchronous motor. When the program switch is set for the third position, the third offset key of timing unit No. 1 is the one that has been selected thereby. Wafer C of switch P serves to connect the synchronous motor of unit No. 1 with the source of A. C. power. The positive A. C. bus 87 (the bus above ground potential) is connected through normally closed offset relay 88, lead 89, switch blade 90, contact $P_{C3}$, lead 91, motor switch 92, motor 93, and common lead 94 to the ground. As will be explained hereafter, switch 92 is located on the concealed panel of the apparatus and can be placed in the "off" position, automatic position, or run position.

Operation of the light switch shaft operating motor 86, is controlled by the advance and release contacts of one of the groups of switches selected. When the third position is selected, this group will include the switches in group 95 of unit No. 1. The upper two switches 95A, 95B, thereof, are the advance switches and 95C is the release switch. As will be explained hereafter, two advance switch keys are employed so that operation of switch blade 95A or 95B will cause movement of light switch control shaft motor 86 to move the shaft and operate the lights in a predetermined sequence. Power is supplied thereto through the A. C. positive bus 87, lead 96, switch arm 97 of wafer $B_B$, contact $P_{B3}$, and lead 98 to the appropriate contactor 95A or 95B (whichever of these switches happens to be closed by its corresponding key), lead 99, closed switch 100, concealed switch 101, lead 102, motor 86, lead 103, and ground. When the concealed switch 101 is in the indicated position, the switch on the front of the panel 104, cannot be used to affect operation of the unit. If it is desired to make the switch on the front of the panel available, to the policeman or traffic control person involved, switch 101 is thrown to its upper position and then switch 104 can be put in lower automatic position so as to function as switch 101 illustrated above, and switch 104 can be thrown to its upper position so as to be operable by hand switch 105.

Switch 100 is the release switch and is controlled by a suitable switch operator on the light switch operating shaft 86. Switch 100 is opened once each cycle during the main street green period (switch IL having been closed). This will stop the light switch operating motor 86 until the appropriate release key operates release switch 95C so as to complete a circuit in shunt with switch 100 and thus bring the light control shaft into synchronism once each revolution of the cylinders. This is known as local resynchronization. This shunt connection can be traced from lead 98, switch 95C, lead 106, lead 107, through the manual switches, lead 102, motor 86, lead 103, and ground.

Each group of three switch contacts of switch $P_B$ is connected together as indicated, inasmuch as each three positions involve one of the units as illustrated.

Switch wafer $P_D$ of the program switch performs the function of selecting the proper offset key on the unit involved. Switch arm 108 of wafer $P_D$ can be assumed to be in contact with the third switch contact $P_{D3}$ so as to select the third offset key of unit No. 1. As is known in the art, the offset control from the central station can be normally energized and de-energized once each cycle.

In order for the unit to keep in synchronization, it is arranged so that the offset switch on the unit closes only during this de-energization. If this switch should close at any other time, the current flowing over the offset wire will cause the offset relay to open, thus stopping the motor in use and bringing it into synchronization. The offset wire which is normally energized from the central station feeds current through line 109, switch arm 108, contact $P_{D3}$, line 110, the lower offset switch $O_3$ of unit No. 1, common connector 111, solenoid 112 of the offset relay 88, lead 113, and to the ground at 114.

The offset switches $O_1$, $O_2$, and $O_3$ are normally open so that solenoid 112 is de-energized and switch 88 is closed, thus furnishing current to the motor. If the unit is out of synchronization, as an offset key is rotated by the cylinder and reaches offset switch $O_3$, switch $O_3$ is closed so as to open offset relay 88. Current is fed from lead 110, lead 111 through solenoid 112 and causes offset relay 88 to open, thus stopping the motor 93. The offset lead is de-energized from the central station for a short space of time at predetermined intervals. For this reason solenoid 112 will not be de-energized again until such a central station de-energization interval takes place. When it does take place, switch 88 again will close and will cause motor 93 to restart, thus causing the offset key to be removed from offset switch $O_3$ so as to open said switch and de-energize the offset relay. If the unit is in time, offset switch $O_3$ will be closed at the same time that the offset wire is de-energized so that the offset relay will remain closed. Offset relay 88 serves to control the appropriate connected motors of any of the units so that instead of having separate offset relays for each unit, as is the conventional practice, only one offset relay is required.

It is apparent that in place of interrupting the supply of power to the unit motor that a braking motor coil could be used, appropriately connecting the switches in the correct relationship thereto.

Interlocking relay 82 and offset relay 88 have been described as operating as marginal relays wherein pulses of voltages of different values can be employed. A preferred method of operating these relays is by use of a half wave rectifier (not shown) inserted in the feed of each so as to permit the selection of either in accordance with the direction in which the current is fed thereto.

Timing units No. 2 and No. 3 have rotating cylinders similar to timing unit No. 1 and operate in a manner similar to that described for unit No. 1. The invention can be used with a single timing unit means to select the desired offset key or program means thereon.

It is quite evident that any one of the nine program switch positions for the illustrated embodiment can be employed to select the desired unit with its particular arrangement of advance and release keys governing the split of the light cycle, and anyone of the three appropriate offset keys on the rotating cylinder or timing unit selected. It is impossible for more than one timing unit to be used to control the light control shaft motor because of the isolation provided by the selector switches mounted on a common shaft. Three extra contacts are illustrated on each switch usable for various additional switching functions. The offset keys, as is known, can be set in various positions relative to each other so that the unit will be synchronized in relation to the other local controllers in a predetermined manner, which can be selected according to the time of day or circumstances involved.

As an example of one embodiment of the invention, parts thereof can be mounted on the main chassis 151 by means of suitable jacks. Through the use of interlocked key hole slot arrangements, the parts can be held irremovably in place until unlocked. In Figure 2, the front panel 152 is shown in closed position and may be held there by means of a screwdriver operated lock or other key arrangement (not shown). On this front or outer panel, the automatic and hand switch 153 corresponds to switch 104 of Figure 1. The signal "on or off" switch 154 is located in the main power line. When the panel is opened, as in Figure 3, the concealed automatic and manual switch 155 is seen which corresponds to switch 101 of Figure 1. The motor "run and control" switches 156 correspond to the switches 92 of Figure 1. Knob 157 is mounted on the program switch P so that said switch can be positioned manually if desired, suitable indicia being provided thereon.

In a preferred form, the rotatable cylinder unit 158 of each timing assembly 159 can comprise a plurality of assembled annular members. The upper two annular members have slots cut or milled therein for receiving the advance keys. Fifty slots may be cut in each member and then the members offset relative to each other so that the two members have 100 available slots, thus permitting the insertion of keys therein 1% apart. The release key is on an annular member which is rotatable relative to the remainder of the members of the assembly, said members being illustrated at 159. The offset keys are located on the lower three annular members 160 and are permanently attached thereto, said members being rotatable relative to the other members so as to selectively position the offset keys as required. The annular members can be arranged with locking means so that after they are rotated and set, they can be locked in their relative adjusted positions. An infinite number of positions can be provided for the release and offset keys and they can be placed directly over each other. An indicating member can be located at the bottom or otherwise in the rotating cylinder assembly for setting purposes to show the exact time at which the keys operate their associated switches. Slots are provided in the front face of the unit so that the protruding keys can rotate with the cylinder and will be accessible for adjustment. It is to be noted that only one type of key is required. The shaft for the rotating cylinder can be rotated in a pair of precision ball bearings attached to a vertical shaft secured to the base by means of a hub. The concentricity is closely held so as to insure accurate timing.

On the top of frame element 161, synchronous motor 162, corresponding to the motor 93 of Figure 1, is eccentrically located on rotatable disc 163. The disc 163 can be removed and a suitable gear placed on the cylinder shaft for engagement with the gear located on the shaft of the motor. An indicating sector 164 having indicia on both the top and front can be employed to show the particular time cycle involved with the particular engaged gears involved. The front indicia on said sector is visible through opening 165A on the front plate of the timing unit. Either wires or any type of electrical connection can be used to connect the synchronous motor with its leads. Locking means can be provided to maintain accurate gear mesh.

A stack of switches 165 is located at the rear of the timing unit for operation by the keys of the rotating cylinder. The particular switch arrangement shown has its elements pivoted at one end of the respective holding blocks, said switches having a sloping faced (right triangles with perpendicular face at trailing edge) projection contactable by the keys for pivoting the switch operators away from the cylinders to close associated switch contacts.

In a preferred form, a cam (not shown) is connected to the plate 163 for contacting the switch assembly to move it in and out in accordance with the particular time cycle involved. With conventional equipment, if the time cycle is short, the time of closure of the advance switches will be extremely short, and if it is long, the time of closure will be long. In order to equalize this, the cam sector is arranged to move the stack of switches in and out so that the closed time interval will be the same regardless of the time cycle. The stack of switches can be pivotally mounted on the frame to provide for the aforesaid adjustment.

In one aspect, the chassis is arranged in the traffic control box on slides and has jack mounts connectable with elements mounted on the box itself. Thus, the entire unit can be disconnected and moved out for servicing purposes eliminating the need for connecting cable except for servicing. Also, the chassis can be rotatably mounted on the slidable frame so that it can be turned to obtain access to the parts.

Figure 5:
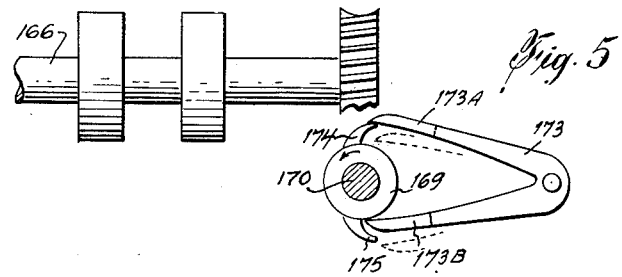
Figure 5 is a fragmentary enlarged view of the light switch controller.
Figure 6:
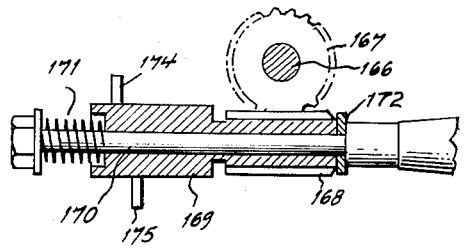
Figure 6 is a section taken along the line 6—6 of Figure 7.

The light switch operators may take the form of cams located on a shaft 166 (Fig. 5), said cams or operating mechanism contacting switches connected to the light circuits for the traffic signals as desired.

Shaft 166 can have a worm wheel 167 thereon meshing with a worm gear 168 connected to bushing 169. Bushing 169 is rotatably carried on motor shaft 170 and spring 171 urges the assembly into contact with the friction disc 172. When shaft 170 rotates, motion will be transmitted to the friction disc and to the bushing worm gear.

In order to provide for only one revolution at a time of the shaft, an escapement mechanism is provided having a pivoted double arm 173. The upper arm 173A is for raising purposes and cooperates with the cam lobe 174 carried on bushing 169. Stop 175 is offset axially relative to lobe 174 and is arranged to cooperate with the lower arm 173B. It is to be noted that the surfaces of the lobe 174 and stop 175 are inclined relative to the surfaces of 173.

The parts are in the position shown in the dotted lines (Fig. 5) at the beginning of the operation of the light shaft operating motor. As cam lobe 174 comes near to the end of a complete revolution, it contacts upper arm 173A and moves it upwardly thus moving the lower arm 173B into blocking position relative to stop 174. This positively stops the worm at a predetermined position. Upon de-energization of the motor, the weight of the arm 173 will give a slight reverse movement to bushing 169 so as to free the lower arm 173B and to allow it to fall downwardly out of blocking position. The spring 171 also serves to assist in the unwinding or reversing of the bushing, said spring having been wound slightly by rotation of the motor. If the motor continues running, the arm 173 does not move out of blocking position so that the light control switch shaft cannot be moved more than a single increment at a single energization of the motor without an intervening de-energization. The lower stop 175 engages the lower arm before the upper arm reaches the end of the cam lobe 174, thus positively preventing constant rotation of the bushing and operating worm. The ratio of the worm gear and worm wheel, for example, may be nine to one, or any other suitable ratio, depending upon the number of cams or switch actuators located on the light control operating shaft.

Such an arrangement will result in very accurate and fast indexing of the switch operators for the light control siwtches. This is accomplished without placing undue strain or impact forces on the various parts involved.

The switch operators can take various forms and may be cams, projections, or any suitable type of mechanism for sequentially operating the controlled switches.

Each of the units is integral and may be removed from the chassis for servicing or setting purposes. Also, it is possible to use any combination of units as desired. This also applied to the motor per se. The light operating shaft and switches may be jack mounted and readily removable from the chassis if necessary. There are no parts moving for the program control arrangement except during the actual programming operation. After the transfer, there is no energy expended to hold the parts in their selected position. The same means is employed for the manual or the automatic or remote selection of the program.

The timing units and switching mechanism also can be used with conventional systems by connecting each of the selection wires (not shown) with one of the contacts of the memory switch, so that the position thereof will depend upon energization thereof.

It is apparent that various details of construction can be changed without departing from the spirit of the invention except as defined in the appended claims.

What is claimed is:

1. In a circuit controller, the combination comprising a controlled device having a plurality of sequentially operable means, an operator for said controlled device, timing means connectable with said operator, said timing means having a plurality of program operating means thereon, program selecting control means selecting any one of the programs on said timing means to be used, normally de-energized intelligence storing mechanism connected to said program selecting control means transferring stored intelligence thereto and operating the same to select the desired program, the transfer being only at predetermined times to select the desired program, and means transmitting intelligence to said intelligence storing mechanism.

2. In a circuit controller, the combination comprising a controlled device having a plurality of sequentially operable means, an operator for said controlled device, a plurality of timing means connectable with said operator, each of said timing means having a plurality of program operating means thereon, and program selecting control means simultaneously selecting the timing means and the program operating means thereon.

3. In a circuit controller, the combination comprising a controlled device having a plurality of sequentially operable means, an operator for said controlled device, a plurality of timing means connectable with said operator, each of said timing means having a plurality of program operating means thereon, program selecting control means simultaneously selecting the timing means and the program operating means thereon, and normally de-energized intelligence storing mechanism connected to said program selecting control means transferring stored intelligence thereto and at predetermined times to select a desired program.

4. In a circuit controller, the combination comprising a controlled sequentially operable switch means, an operator for said switch means, timing means connectable with said operator, said timing means having a plurality of program operating means thereon, program selecting control means connected to said timing means selecting any one of said program operating means, an electrical pulse operated intelligence storing mechanism connected to said program selecting control means transferring stored intelligence thereto at predetermined times to select a desired program and means connected to said intelligence storing mechanism imparting the desired intelligence thereto.

5. In a circuit controller, the combination comprising a controlled sequentially operable switch means, an operator for said switch means, a timing unit having a plurality of program operating means, stepping switch program control means connected to said timing unit for selecting a program, a stepping switch memory device connected to said program selecting control means transferring the intelligence stored thereon at predetermined times to the program selecting control means to select a desired program, and means setting said stepping switch memory device at a desired program selecting step.

6. In a traffic signal circuit controller, the combination comprising a controlled traffic signal light switch mechanism, an operator connected to said mechanism, timing units selectively connectable with said operator, a plurality of means for synchronizing each of said timing units according to a predetermined pattern, a program switch means selecting a timing unit and synchronizing means thereon, and a normally de-energized memory switch connectable with said program switch means for setting the program switch.

7. In a traffic signal circuit controller, the combination comprising a controlled traffic signal light switch mechanism, an operator connected to said mechanism, timing units selectively connectable with said operator, a plurality of means for synchronizing each of said timing units according to a predetermined pattern, a program switch means selecting a timing unit and synchronizing means thereon, and an electrical pulse operated memory switch connectable with said program switch means for setting the program switch.

8. In a traffic signal circuit controller, the combination comprising a controlled traffic signal light switch mechanism, an operator connected to said mechanism, timing units selectively connectable with said operator, a plurality of means for synchronizing each of said timing units according to a predetermined pattern, a program switch means selecting a timing unit and synchronizing means thereon, an electrical pulse operated memory switch connectable with said program switch means for setting the program switch, and means preventing setting of said program switch except during display of a predetermined light.

9. In a traffic signal control apparatus, the combination including local control mechanism having light switch mechanism, operating means for said light switch mechanism, timing unit means controlling said operating means, program control switch means selecting the desired timing unit means, a memory switch means selectively moving said program control means, and a maximum of two wires transmitting intelligence from a central station to said memory switch mechanism.

10. In a traffic signal control apparatus, the combination including local control mechanism having light switch mechanism, operating means for said light switch mechanism, timing unit means controlling said operating means, program control switch means selecting the desired timing unit means, a memory switch means selectively moving said program control means only at predetermined times in the cycle, and a maximum of two wires transmitting intelligence from a central station to said memory switch mechanism.

11. In a traffic signal control apparatus, the combination including a local control station mechanism having a sequentially operable light switch means, an operator for said light switch means, a plurality of motor driven timing units controlling operation of said operator, a plurality of offset means on each timing unit, a program switch simultaneously selecting a timing unit and a particular offset means thereon, and a normally de-energized memory switch connected with said program switch transferring intelligence received from a central station thereto only at predetermined times in the cycle.

12. In a traffic signal control apparatus, the combination including a local control station mechanism having a sequentially operable light switch means, an operator for said light switch means, a plurality of motor driven timing units controlling operation of said operator, a plurality of offset means on each timing unit, a stepping program switch simultaneously selecting a timing unit and a particular offset means thereon, and a pulse operated memory stepping switch connected with said program switch transferring intelligence received from a central station thereto only at predetermined times in the cycle.

13. In a traffic signal circuit controller, the combination comprising a controlled device operating light switch means, an operator for said controlled device, a plurality of timing means selectively connectable with said operator, a program control means for selecting the timing means controlling said controlled device, a memory switch connectable with said program control means and transferring intelligence stored thereon at predetermined times, and means automatically returning said program control means and memory switch to a predetermined first position.

14. In a traffic signal circuit controller, the combination comprising a controlled device operating light switch means, an operator for said controlled device, a plurality of timing means selectively connectable with said operator, a program control means for selecting the timing means controlling said controlled device, a memory switch connectable with said program control means and transferring intelligence stored thereon at predetermined times, and means automatically returning said program control means and memory switch to a first position upon failure of the control circuits for the memory switch.

15. In a traffic signal circuit controller, the combination comprising a controller device operating light switch means, an operator for said controlled device, a plurality of timing means selectively connectable with said operator, a program control means for selecting the timing means controlling said controlled device, a memory switch connectable with said program control means and transferring intelligence stored thereon at predetermined times, means automatically returning said program control means and memory switch to a predetermined first position, and a supervisory relay in the memory switch circuit automatically returning said switch to a first position unless said relay is energized.

16. In a traffic signal control device, the combination including sequentially operable light switch operating means, a motor turning intermittently said operating means, a plurality of motor driven timing units having means connected with said motor for operating the same, an offset means on each timing unit for maintaining said units in predetermined relationship with a central station, a program control stepping switch for selecting the desired timing unit and offset means, a pulse operated memory switch connected with said program control switch, a local pulsing means connected with said memory switch, a pulsing relay connectable with a central station for operating said memory switch, and a supervisory relay connected with said local pulsing means and rendering it effective when desired to return the memory switch to a first position.

17. In a traffic signal control device, the combination including sequentially operable light switch operating means, a motor turning intermittently said operating means, a plurality of motor driven timing units having means connected with said motor for operating the same, an offset means on each timing unit for maintaining said units in predetermined relationship with a central station, a program control stepping switch for selecting the desired timing unit and offset means, a pulse operated memory switch connected with said program control switch, a local pulsing means connected with said memory switch, a pulsing relay connectable with a central station for operating said memory switch, a supervisory relay connected with said local pulsing means and rendering it effective when desired to return the memory switch to a first position, and an interlock relay operated by said light switch operating means preventing transfer of the memory switch intelligence to the program unit except at a predetermined light display.

18. In a traffic signal controller having light switch operating means, an operator intermittently advancing said operating means, and motor driven timing unit means providing a plurality of programs for operating said switch operating means, the combination including a pulse operated program selecting switch, said program selecting switch being rotatable by an axially movable solenoid operated switch rotator, said switch rotator having balls engaging an inclined face and being connected to the switches by a ratchet mechanism, a pulse operated memory switch connectable with said program selecting switch for transferring stored intelligence thereto, said memory switch being rotatable by an axially movable solenoid operated rotator having balls engaging an inclined face and being connected to its switches by a ratchet mechanism, and local pulsing switches for each of said pulse operated switches operable by said rotator.

19. In a traffic signal apparatus, the combination including a sequentially operable light switch mechanism, operating means for said light switch mechanism, synchronizing means operable by a central station, a plurality of timing units having driving motors, each of said units having switch means connectable with said operating means for moving the same, and a common offset relay mechanism, at least one of said switch means of each timing unit being selectively connectable with said common offset relay operating mechanism, said common offset relay mechanism being connectable with said synchronizing means so that the selected timing unit will be in synchronism with the synchronizing means, its driving motor being arrested until synchronized.

JOHN J. ALLES.

References Cited in the file of this patent

UNITED STATES PATENTS

| Number | Name | Date |
| --- | --- | --- |
| 1,900,595 | Weber | Mar. 7, 1935 |
| 2,037,900 | Hastings | Apr. 21, 1936 |
| 2,091,954 | Bissell | Sept. 7, 1937 |
| 2,194,310 | Leonard | Mar. 19, 1940 |
| 2,236,298 | Reid | Mar. 25, 1941 |
| 2,236,299 | Reid | Mar. 25, 1941 |
| 2,292,714 | Paul et al. | Aug. 11, 1942 |
| 2,339,111 | Reid | Jan. 11, 1944 |
| 2,451,457 | Shepherd | Oct. 12, 1948 |
| 2,531,153 | Pennell | Nov. 21, 1950 |
| 2,624,793 | Pearson | Jan. 6, 1953 |

FOREIGN PATENTS

| Number | Country | Date |
| --- | --- | --- |
| 397,584 | Great Britain | Aug. 31, 1933 |